United States Patent
Ito

(10) Patent No.: US 7,107,598 B2
(45) Date of Patent: Sep. 12, 2006

(54) DISK DEVICE HAVING REDUCED DISK CONTACT AREAS AGAINST OUTER PERIPHERAL SURFACE OF DISK

(75) Inventor: Shigehiro Ito, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 173 days.

(21) Appl. No.: 10/638,380

(22) Filed: Aug. 12, 2003

(65) Prior Publication Data
US 2004/0071063 A1 Apr. 15, 2004

(30) Foreign Application Priority Data
Oct. 15, 2002 (JP) .............................. 2002-300880

(51) Int. Cl.
G11B 17/04 (2006.01)
(52) U.S. Cl. ....................................... 720/623; 720/619
(58) Field of Classification Search ......... 360/619–625
See application file for complete search history.

(56) References Cited

U.S. PATENT DOCUMENTS

| 5,031,169 A | * | 7/1991 | Kato et al. ................. 720/625 |
| 5,036,509 A | * | 7/1991 | Kobayashi et al. ......... 720/623 |
| 5,764,612 A | * | 6/1998 | Tanaka et al. .............. 720/623 |
| 6,084,838 A | * | 7/2000 | Tanaka et al. .............. 720/620 |
| 6,288,982 B1 | * | 9/2001 | Kato ........................ 369/30.36 |
| 6,636,470 B1 | * | 10/2003 | Sasada et al. ............... 720/622 |
| 6,779,190 B1 | * | 8/2004 | Akatani et al. ............. 720/624 |

FOREIGN PATENT DOCUMENTS

| CN | 1155144 A A | 7/1997 |
| CN | 1142550 C | 3/2004 |
| DE | 198 54 920 A1 | 6/1999 |
| DE | 101 14 459 A1 | 9/2002 |
| JP | 62-27463 B2 | 6/1987 |

* cited by examiner

Primary Examiner—Brian E. Miller
(74) Attorney, Agent, or Firm—Birch, Stewart, Kolasch & Birch, LLP

(57) ABSTRACT

A guide flap is a member shaped like substantially a plate, and a pair of disk guide parts are formed on both sides of the guide flap. The respective inside portions of the disk guide parts form disk contact portions that abut against the outer peripheral surface of a disk and support the disk. The disk contact portion is formed in an uneven shape having a plurality of grooves extending in the direction of thickness of the disk.

1 Claim, 5 Drawing Sheets

DISK DEVICE HAVING REDUCED DISK CONTACT AREAS AGAINST OUTER PERIPHERAL SURFACE OF DISK

This nonprovisional application claims priority under 35 U.S.C. § 119(a) on Patent Application No(s). 2002-300880 filed in JAPAN on Oct. 15, 2002, which is (are) herein incorporated by reference.

BACKGROUND OF THE INVENTION

1. Field of the Invention

This invention relates to a disk device that optically records or reproduces video audio information and the like on or from a disk such as a DVD (digital versatile disk).

2. Description of the Related Art

A disk device that records or reproduces video audio information on or from a disk such as a DVD or the like has a frame having an inserting slot of the disk, a guide flap that is fixed near the inserting slot of this frame and guides the disk, a roller that applies a transfer force to the disk guided between the roller itself and this guide flap, a roller base that supports this roller, and a disk size selection lever for determining size of the disk. A disk contact part that abuts against the outer peripheral surface of the disk and supports the disk is arranged at a position facing a transfer path of the disk of each of the guide flap, the roller base, and the disk size selection lever. Each disk contact part of a conventional disk device has a face that abuts against a part of outer peripheral surface of the disk in a direction of thickness and in a direction of periphery. For example, refer to a patent 1.

[Patent 1] Japanese Examined Patent Publication Sho 62-27463 (P2, FIG. 1 and FIG. 2)

By the way, a bonded disk such as a DVD is made by bonding one disk plate having a label face to another disk plate, which is of the same shape and size as the former disk plate and has a recording face, with an adhesive material. For this reason, there is a case where the adhesive material applied between both of the disk plates oozes out of the outer peripheral surface of the bonded disk.

However, the conventional disk device has the above-mentioned construction. Then, if the disk contact part abuts against the outer peripheral surface of the bonded disk when the bonded disk is inserted into or ejected from the disk device, an operating load is increased by a friction produced between the contact surfaces by the adhesive material oozing out of the outer peripheral surface. Thus, there is presented a problem that the bonded disk cannot be smoothly inserted or ejected to incur malfunction in the worst case.

SUMMARY OF THE INVENTION

The present invention has been made to solve the above described problem. It is an object of the present invention to provide a disk device having a structure which allows a contact disk part to avoid coming into contact with an adhesive material oozing out of the outer peripheral surface of a bonded disk to the greatest extent practicable.

A disk device in accordance with the present invention includes a case or a frame, and the terms frame and case are used interchangeably. The disk device further includes a guide flap member or guide member that is fixed to the case and guides a disk, a roller that applies a transfer force to the disk guided by the guide member, a roller support member that rotatably support the roller, and a disk size selection lever for determining the size of the disk, and the disk device is characterized in that at least one of disk contact portions of the guide member, the roller support member, and the disk size selection lever, which come into contact with the outer peripheral surface of the disk, is formed in a shape that reduces a contact area.

Thus, according to the present invention, it is possible to reduce the area of contact of the outer peripheral surface of the disk with the respective disk contact parts to the greatest extent practicable and hence to prevent an increase of the operating load by a friction produced between the contact surfaces by an adhesive material oozing out of the outer peripheral surface of the bonded disk. Therefore, this produces an effect of smooth inserting or ejecting the bonded disk into or from the disk device.

BRIEF DESCRIPTION OF THE DRAWINGS

FIG. 4 is a diagram to show the structure of a guide member of the disk device shown in FIG. 1 to FIG. 3, herein

FIG. 11 is a diagram to show the structure of a guide member of the disk device in accordance with embodiment 2 of the present invention, herein FIG. 1A is a plan view and FIG. 11B is a front view.

DETAILED DESCRIPTION OF THE PREFERRED EMBODIMENTS

Hereinafter the preferred embodiments of the present invention will be described.

Embodiment 1

Figure 1:
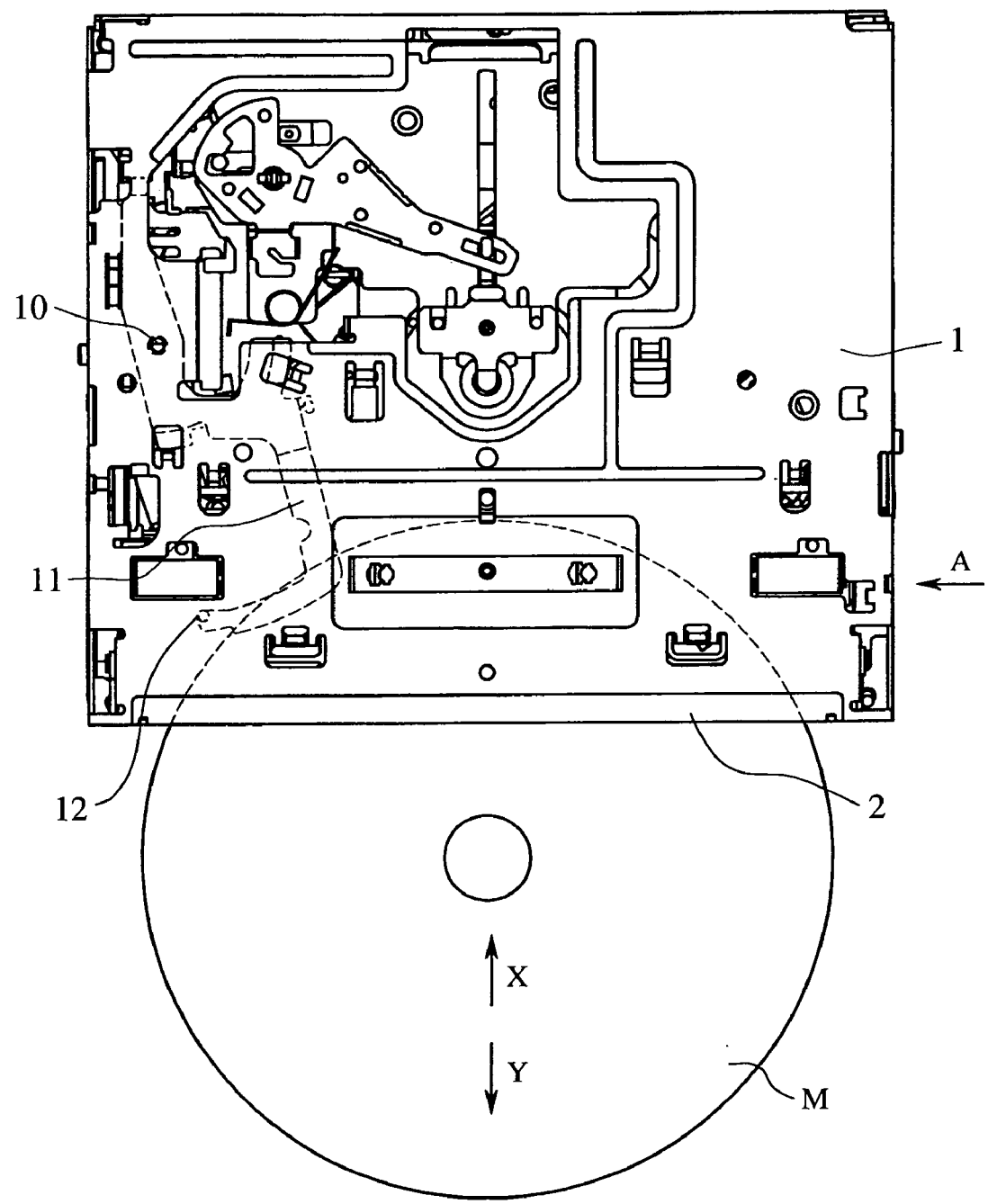
FIG. 1 is a plan view to show a disk device in accordance with embodiment 1 of the present invention.
Figure 2:
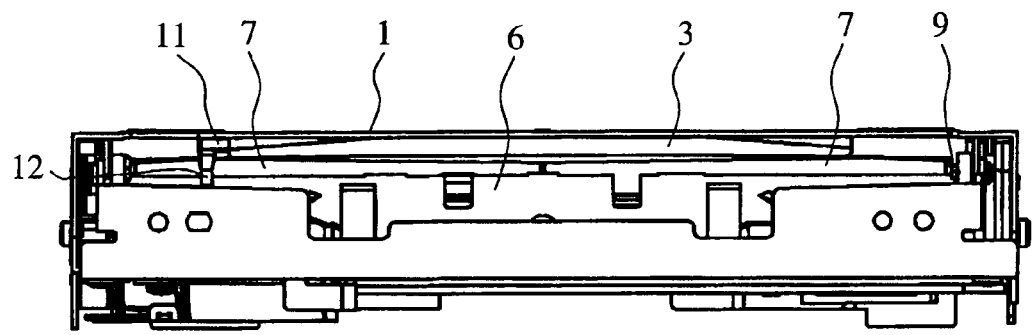
FIG. 2 is a front view to show the disk device shown in FIG. 1.
Figure 3:
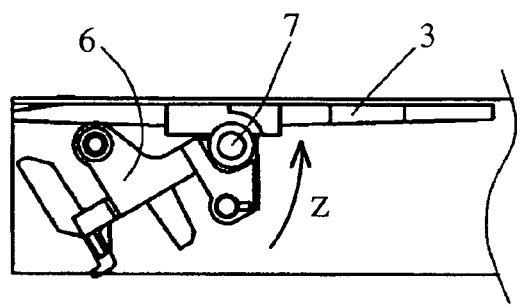
FIG. 3 is a side view of internal structure of the disk device shown in FIG. 1 when viewed from a direction shown by arrow A.
Figure 4A:
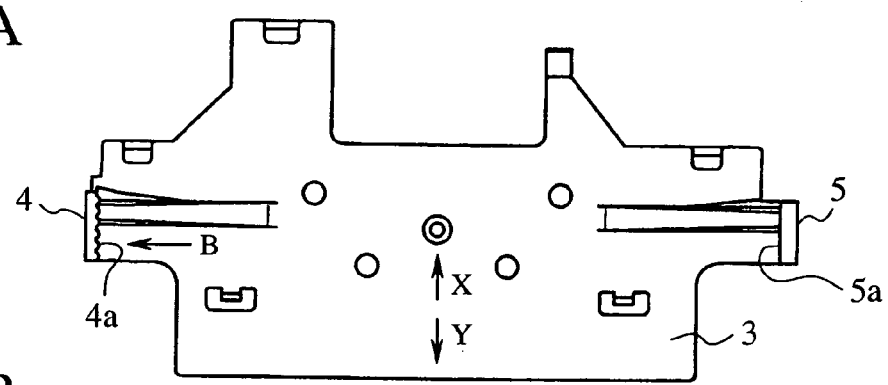
FIG. 4A is a plan view and FIG. 4B is a front view.
Figure 4B:
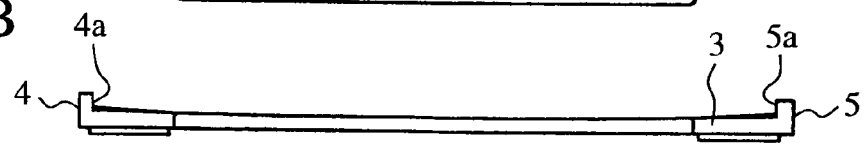
Figure 5:
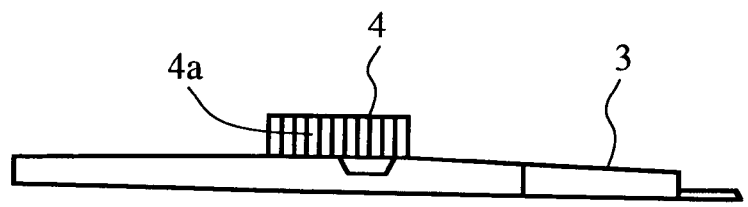
FIG. 5 is an enlarged view of a relevant part of the guide member shown in FIG. 4 when viewed from a direction shown by arrow B.
Figure 6:
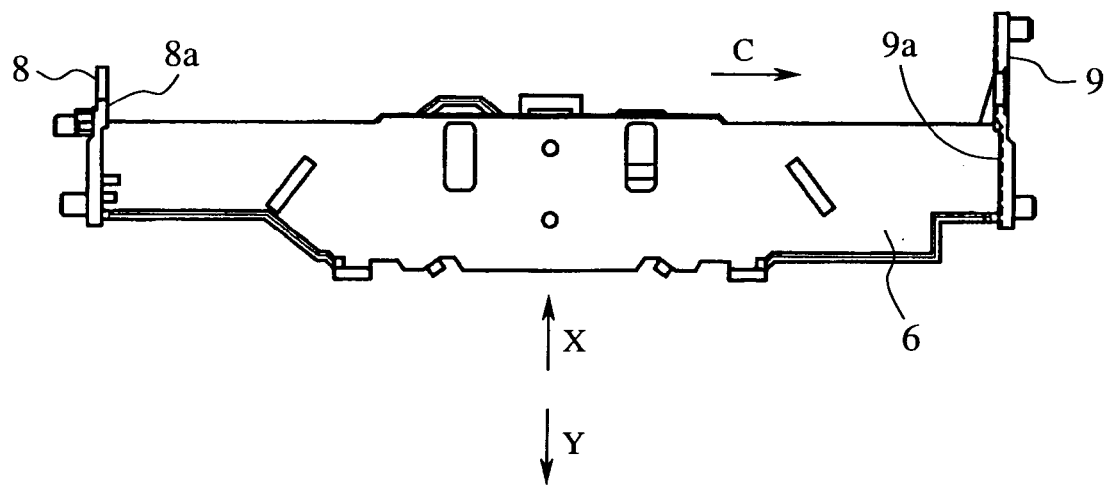
FIG. 6 is a plan view to show the structure of a roller support member of the disk device shown in FIG. 1 to FIG. 3.
Figure 7:
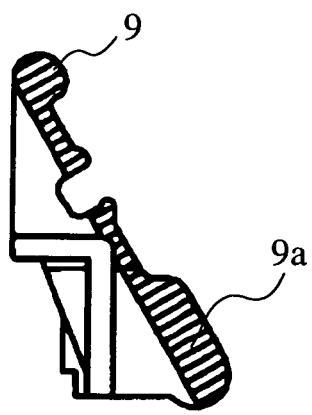
FIG. 7 is an enlarged view of a relevant part of the roller support member shown in FIG. 6 when viewed from a direction shown by arrow C.
Figure 8:
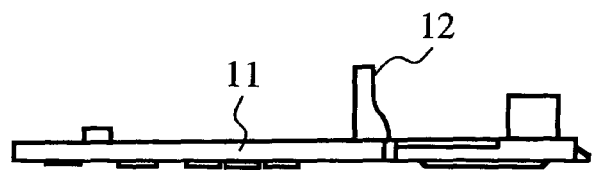
FIG. 8 is a front view to show a pin portion of a lever of the disk device shown in FIG. 1 to FIG. 3.
Figure 9:
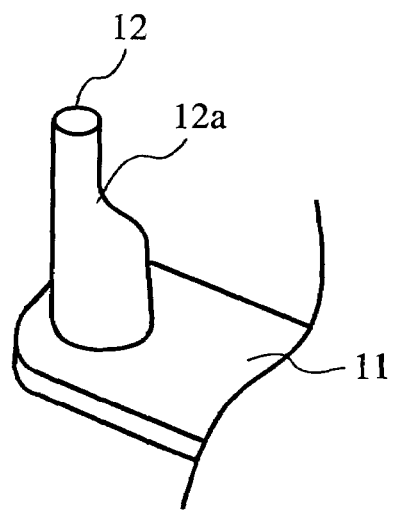
FIG. 9 is a perspective view, on an enlarged scale, to show the pin portion of the lever shown in FIG. 8.
Figure 10:
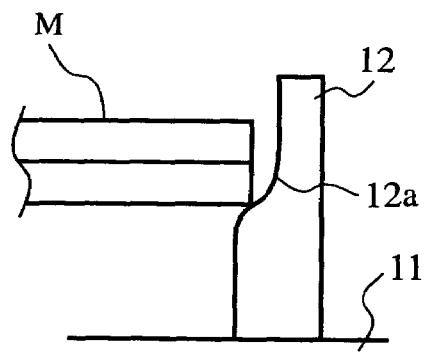
FIG. 10 is a side view to show a state in which a bonded disk abuts against the pin portion of the lever shown in FIG. 8 and FIG. 9.

FIG. 1 is a plan view to show the internal structure of a disk device in accordance with embodiment 1 of the present invention. FIG. 2 is a front view to show the disk device shown in FIG. 1. FIG. 3 is a side view of the internal structure of the disk device shown in FIG. 1 when viewed from a direction shown by arrow A. FIG. 4 is a diagram to show the structure of a guide member of the disk device shown in FIG. 1 to FIG. 3, herein FIG. 4A is a plan view and FIG. 4B is a front view. FIG. 5 is an enlarged view of a relevant part of the guide member shown in FIG. 4 when viewed from a direction shown by arrow B. FIG. 6 is a plan view to show the structure of a roller support member of the disk device shown in FIG. 1 to FIG. 3. FIG. 7 is an enlarged view of a relevant part of the roller support member shown in FIG. 6 when viewed from a direction shown by arrow C. FIG. 8 is a front view to show a pin portion of a disk size selection lever of the disk device shown in FIG. 1 to FIG. 3. FIG. 9 is a perspective view, on an enlarged scale, to show the pin portion of the disk size selection lever shown in FIG. 8. FIG. 10 is a side view to show a state in which a bonded disk abuts against a pin of the disk size selection lever shown in FIG. 8 and FIG. 9.

In the drawings, reference numeral 1 denotes a frame (case) of the disk device. An inserting slot 2 for inserting or ejecting a disk M such as a DVD is formed in the front (bottom side in FIG. 1) of the frame 1. A guide flap (guide member) 3 for guiding the disk M is fixed to one surface (ceiling) near the inserting slot 2 of the frame 1. The guide flap 3 as shown in FIG. 4A and FIG. 4B, is a member shaped like substantially a plate. A pair of disk guide portions 4 and 5 extending along a direction in which the disk M is loaded (the direction shown by arrow X) and a direction in which the disk M is ejected (direction shown by arrow Y) are formed on both sides of the guide flap 3. The insides of these disk guide parts 4 and 5 is made to form disk contact portions 4a and 5a that abut against the outer peripheral surface of the disk M and supports the disk M. The disk contact portion 4a in this embodiment 1, as shown in FIG. 4A and FIG. 5, is made to be formed in an uneven shape having a plurality of grooves extending in the direction of thickness of the disk M (in a shape that reduces a contact area).

Near the inserting slot 2 of the frame 1, a roller base 6 is arranged at a position opposite to the guide flap 3. The roller base 6, as shown in FIG. 3, rotatably supports a roller 7 that applies a transfer force to the disk M which is guided between the roller base 6 itself and the guide flap 3. The roller base 6 is urged by the urging force of a spring (not shown) in the direction shown by arrow Z to press the roller 7 onto the guide flap 3, thereby puts and holds the disk M between the roller 7 and the guide flap 3. Disc guide parts 8 and 9 extending along the direction in which the disk M is loaded (the direction shown by arrow X) and the direction in which the disk M is ejected (the direction shown by arrow Y) are formed on both sides of the roller base 6. The respective insides of these disk guide parts 8 and 9 is made to form disk contact portions 8a and 9a that abut against the outer peripheral surface of the disk M and supports the disk M. The disk contact portion 9a in this embodiment 1, as shown in FIG. 6 and FIG. 7, is made to be formed in an uneven shape having a plurality of grooves extending in the direction of thickness of the disk M (in a shape that reduces a contact area). In this respect, the roller 7 can be rotated in both forward and reverse directions by a rotating driving motor (not shown) in such a way as to transfer the disk M in the direction shown by arrow X or in the direction shown by arrow Y.

A disk size selection lever 11 that is rotatably supported by a support shaft 10 and determines a size (outer diameter) of the disk M is arranged in the frame 1. A pin 12 that abuts against the outer peripheral surface of the disk M and turns is provided at a tip of the disk size selection lever 11. The pin 12 tapers off at the tip as a whole and in particular, a part of its outer peripheral surface is made to form a disk contact portion 12a. A disk contact portion 12a, as shown in FIG. 8 and FIG. 9, is made to be formed in the shape of a taper that abuts against only the outer peripheral edge portion that is a part of outer peripheral surface of the disk M (in a shape that reduces a contact area).

Next, an operation will be described.

First, when the disk M is inserted through the inserting slot 2, the rotating driving motor (not shown) is driven and then the roller 7 is rotated, by its rotating driving force, forward in the direction in which the disk M is loaded (in the direction shown by arrow X), whereby the disk M is transferred into the frame 1. When the disk M is transferred, the pin 12 of the disk size selection lever 11 abuts against a part of slanting front portion of the outer peripheral surface of the disk M. At this time, because the disk contact portion 12a of the pin 12 is made to be shaped in a taper, only the outer peripheral edge portion of outer peripheral surface of the disk M abuts against the disk contact portion 12a and a central portion of the outer peripheral surface which has a possibility that an adhesive material might ooze out, never comes into contact with the disk contact portion 12a.

When the disk M is further transferred into a back portion of the frame 1, among all outer peripheral surface of the disk M, only both sides in a direction perpendicular to the direction in which the disk M is loaded, of outer peripheral surface abuts against the disk contact portion 4a of the guide flap 3 and the disk contact portion 9a of the roller base 6. At this time, because each of the disk contact portions 4a and 9a has an uneven surface, the area of contact of each of the disk contact portions 4a and 9a with the outer peripheral surface of the disk M is reduced.

As described above, according to this embodiment 1, the disk contact portion 12a of pin 12 of the disk size selection lever 11 is so constructed as to be shaped like a taper. Thus, it is possible to avoid the disk contact portion 12a from coming into contact with the adhesive material oozing out of the outer peripheral surface of the disk M and hence to prevent an increase of the operating load caused by a friction produced by the adhesive material oozing out of the outer peripheral surface of the disk M. Therefore, it is possible to produce an effect of smooth inserting and ejecting the disk M into or from the disk device.

In this embodiment 1, the disk contact portion 4a of disk guide part 4 of the guide flap 3 is so constructed as to have the uneven shape. Thus, it is possible to reduce the area of contact of the disk contact portion 4a with the outer peripheral surface of disk M to the greatest extent practicable and hence to prevent an increase of the operating load caused by the oozing adhesive material. Therefore, it is possible to produce an effect of smooth inserting and ejecting the disk M into or from the disk device.

In this embodiment 1, the disk contact portion 9a of disk guide part 9 of the roller base 6 is so constructed as to have the uneven shape. Thus, it is possible to reduce the area of contact of the disk contact portion 9a with the outer peripheral surface of the disk M to the greatest extent practicable and hence to prevent an increase of the operating load caused by the oozing adhesive material. Therefore, it is possible to produce an effect of smooth inserting and ejecting the disk M into or from the disk device.

In this embodiment 1, the disk contact portion 12a of pin 12 of the disk size selection lever 11 is so constructed as to be shaped like a taper and at the same time the disk contact portion 4a of disk guide part 4 of the guide flap 3 and the disk contact portion 9a of disk guide part 9 of the roller base 6 are so constructed to have the uneven shape, respectively. However, it is possible to prevent an increase of the operating load caused by the oozing adhesive material only by forming at least one of the respective disk contact portions in the shape of reducing the contact area such as the tapering shape or the uneven shape. Therefore, it is possible to produce an effect of smooth inserting and ejecting the disk M into or from the disk device.

Embodiment 2

Figure 11A:
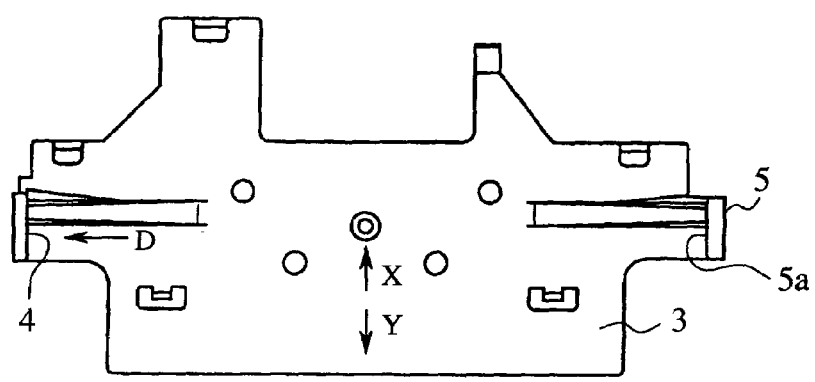
Figure 11B:
Figure 12:
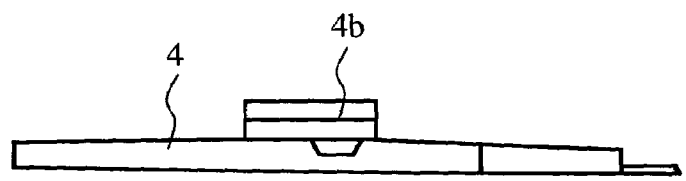
FIG. 12 is an enlarged view of a relevant part of the guide member shown in FIG. 11 when viewed from a direction shown by arrow D.

FIG. 11 is a diagram to show the structure of a guide member of the disk device in accordance with embodiment 2 of the present invention. FIG. 11A is a plan view and FIG. 11B is a front view. FIG. 12 is an enlarged view of a relevant part of the guide member shown in FIG. 11 when viewed from a direction shown by arrow D. Here, of the constituent elements in this embodiment 2, parts which are common to constituent elements in the embodiment 1 are denoted by the same reference numerals and their further descriptions will be omitted.

The feature of this embodiment 2 is different from the embodiment 1 and it lies in a point that an inside portion of disk guide part 4 of the guide flap 3, with which a central portion having a possibility that the adhesive material might ooze, of outer peripheral surface of the disk M, comes into contact, is made to be depressed outward to form a disk contact portion 4b and it is formed by two tapers extending from the depressed point in the direction of thickness of the disk M thereby to be shaped like a letter V in cross section. With this shape of the disk contact portion 4b, when the outer peripheral surface of the disk M abuts against the disk contact portion 4b, though the outer peripheral portion of the disk M comes into contact with the two tapering portions, it is possible to avoid the disk contact portion 4b from coming into contact with the adhesive material oozing out of the outer peripheral surface of the disk M.

As described above, according to this embodiment 2, the disk contact portion 4b of disk guide part 4 of the guide flap 3 is so constructed as to be shaped like a letter V in cross section that is formed of two tapers. Thus, it is possible to avoid the disk contact portion 4b from coming into contact with the adhesive material oozing out of the outer peripheral surface of the disk M and hence to prevent an increase of the operating load caused by the friction produced between the contact surfaces by the adhesive material oozing out of the outer peripheral surface of the disk M. Therefore, it is possible to produce an effect of smooth inserting and ejecting the disk M into or from the disk device.

In the embodiment 1 and the embodiment 2, the tapering shape or the uneven shape has been selected as the shape that reduces the contact area of disk contact portions 4a, 4b, 9a and 12a. However, it is not intended to limit the present invention to only these shapes, but any shape may be applicable as far as it produces an effect of reducing the contact area.

What is claimed is:

1. A disk device comprising:
a frame;
a guide member, having at least one disk contact portion, that is fixed to the frame and guides a disk;
a roller that applies a transfer force to the disk guided by the guide member;
a roller support member, having at least one disk contact portion, that rotatably supports the roller; and
a disk size selection lever, having at least one disk contact portion, for determining a size of the disk,
wherein at least one of the at least one disk contact portions of the guide member, at least one of the at least one disk contact portions of the roller support member, and the disk contact portion of the disk size selection lever, which come into contact with an outer peripheral surface of the disk, are formed in an uneven shape or in a character "V" shape that reduces a contact area.

* * * * *